Waldo W. Higgins
INVENTOR.

Patented July 2, 1946

2,403,079

UNITED STATES PATENT OFFICE 2,403,079

JOINDER OF PORCELAIN ENAMELED PRODUCTS

Waldo W. Higgins, Whitefish Bay, Wis., assignor to A. O. Smith Corporation, Milwaukee, Wis., a corporation of New York Application April 30, 1942, Serial No. 441,201

6 Claims. (Cl. 154—2)

This invention relates to the joinder of porcelain enameled products.

The principal object of the invention is to provide a novel method of interfusing ceramic enamel coatings on articles.

Another object of the invention is to provide an article of two or more parts bonded together by a fused ceramic enamel material free from the entrapment of air or gases.

In accordance with the invention the parts to be joined are first enameled to present a comparatively small initial area of contact when assembled under pressure contact, assembled and heated to a temperature substantially below the firing temperature of the enamel to soften the latter and gradually increase the area of contact, effecting bonding of the enamel coatings.

In carrying out the invention it is preferable to have the enamel crowned in thickness at the center on the flat surfaces to be joined so as to provide an initial contact in a restricted central area which progressively expands outward as the enamel coatings soften under heat and pressure until the required area of joinder is obtained. Furthermore, the enamel coatings should be of substantial thickness to provide the best bond therebetween.

Figure 1:
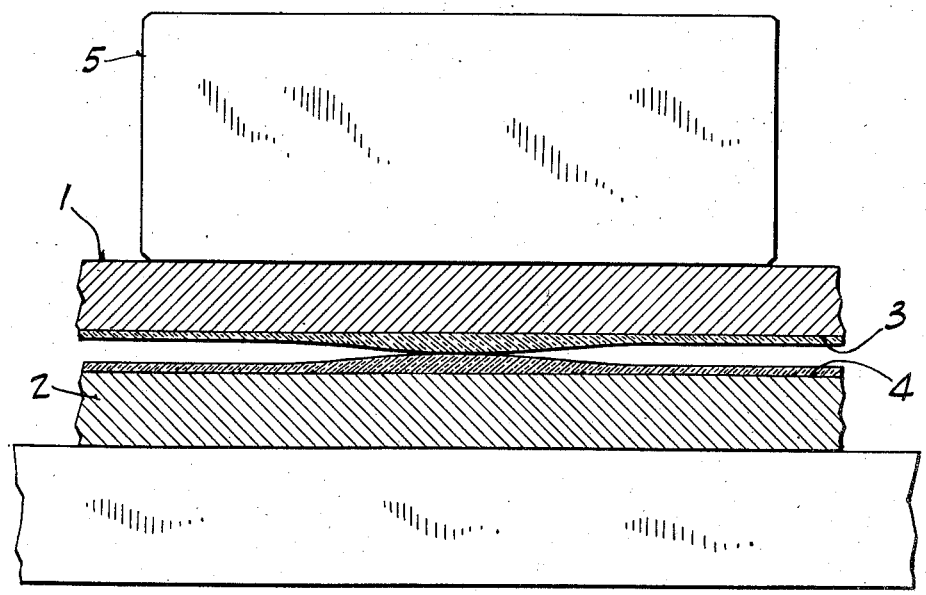
Figure 2:
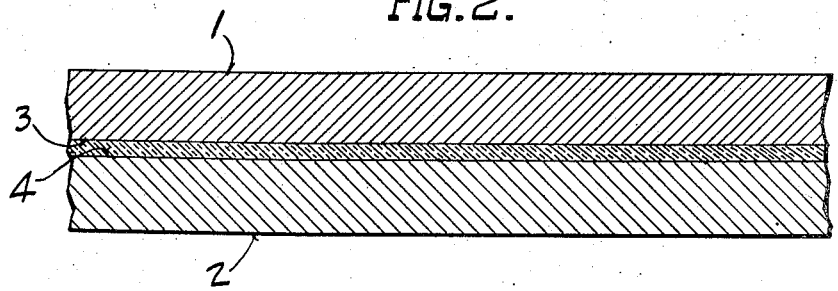

The preferred method of carrying out the invention is illustrated in the accompanying drawing, in which:

Figure 1 is a transverse section through two enameled metal parts to be joined, shown in pressure contact ready for the interfusion of the coatings; and Fig. 2 is a similar view of the parts after the joinder is completed.

The parts 1 and 2 to be joined are of metal and may be of any desired shape depending upon the article being fabricated. The parts 1 and 2 have their respective opposed adjacent faces 3 and 4 complementary, preferably flat, and the shape of the parts should be symmetrical so that their expansion and contraction under temperature changes will not disrupt the enamel bond.

The faces 3 and 4 are first enameled with several successive coats of a hard ceramic enamel with a firing temperature around 1600° F. The last coat of enamel should be of a composition and should be applied under conditions which avoid surface defects. This final coat is preferably brushed away at the outer edges prior to firing so as to obtain a crowned surface with the enamel thicker at the center than at the edges as illustrated in exaggerated form in Fig. 1.

After the parts are enameled as above described they are assembled with the crowned enamel coatings in initial contact over a restricted area near the center of the surfaces being joined. The parts are then pressed together as by a weight 5 or by other suitable pressure applying means, preferably under a pressure of about one-half pound per square inch of surface. The actual pressure employed may be substantially greater and may be varied depending upon the type and thickness of enamel and the temperature employed for interfusing the same.

The parts, thus held together under pressure, are then heated to a temperature sufficient to substantially soften the enamel coatings without decomposing any of the constituents and without obtaining reactions in the coatings such as occur upon refiring. Preferably, the temperature employed will be from one hundred to two hundred degrees below the firing temperature of the last enamel coat. Where a firing temperature in excess of 1600° F. is employed, a heating to about 1450° F. for about 35 minutes under the pressure conditions described is sufficient to obtain a good bonding of the enamel coats together. The length of time of heating should be about three or four times that for firing a coat of enamel and will depend somewhat upon the softening characteristics of the enamel employed, the thickness of the enamel and the pressure applied thereto.

The pressure on the parts may be removed after the parts have cooled below the critical temperature of the enamel so that the latter has become set.

The invention provides an interfusion of the enamel coatings free from flaws at the joinder. The parts are bonded together with a fluid tight joint therebetween having a tensile strength of the order of at least three thousand pounds per square inch.

The invention may be employed to join a series of parts together as in the manufacture of high tension electrical insulating bushings and the like, as set forth in applicant's copending application, Serial No. 441,199, filed on even date herewith, or it may be employed in the manufacture of various other products such as in the joinder of ceramic lined parts subject to corrosion and in which the linings are interfused over the joint.

Various embodiments of the invention may be employed within the scope of the accompanying claims.

The invention is claimed as follows:

1. The method of joining metal members by a fused ceramic material bonded to their opposed adjacent surfaces, comprising coating the said surfaces of the members with ceramic enamel with the outer surfaces of the coatings curved relatively to effect a substantially restricted initial contact therebetween when assembled for joining, assembling said members with the enamel coatings in pressure contact, and heating the members to effect softening of the enamel with attendant progressive increase in the area of contact therebetween to thereby interfuse said coatings substantially free from gas bubbles at the juncture.

2. The method of interfusing ceramic enamel coatings on opposed adjacent surfaces of metal members, comprising centrally crowning the coatings to be joined, assembling the members with the coatings in contact, and applying pressure and heat simultaneously to soften and interfuse the coatings.

3. The method of interfusing ceramic enamel coatings on opposed adjacent surfaces of metal members, comprising assembling said members with the enamel coatings in restricted initial contact, and applying heat and pressure to soften the coatings and progressively increase the area of contact therebetween until the coatings are interfused and bonded together over a substantial area.

4. The method of interfusing ceramic enamel coatings on opposed adjacent surfaces of metal members, comprising assembling said members with the enamel coatings in restricted initial contact, and applying heat and pressure to soften the coatings and progressively increase the area of contact therebetween until the coatings are interfused and bonded together over a substantial area, said heating being to a sufficiently low temperature to prevent reactions in the coating attendant upon refiring thereof.

5. In ceramic enameling the flat surface of a member preparatory to interfusing the same with another, the steps of applying and firing successive coats of ceramic enamel thereto to obtain the required thickness of enamel, and applying and firing a coat of ceramic enamel on only a portion of the surface of the member to provide a crown in the surface for facilitating the interfusion of the enamel surfaces.

6. The method of interfusing ceramic enamel coatings on complementary surfaces of metal members, comprising applying and firing an additional coat of ceramic enamel on only a portion of the enameled surface of the member to provide a crown in the surface for facilitating the interfusion of the enamel surfaces, and applying pressure and heat simultaneously to soften and interfuse the coatings.

WALDO W. HIGGINS.